(12) United States Patent
Stowers

(10) Patent No.: US 6,231,283 B1
(45) Date of Patent: May 15, 2001

(54) VEHICLE RESTRAINT APPARATUS

(76) Inventor: Thomas R. Stowers, 4838 Flower Hill, Troy, MI (US) 48098

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/929,516

(22) Filed: Sep. 15, 1997

(51) Int. Cl.[7] .................................................. B60P 7/08
(52) U.S. Cl. ..................... 410/9; 410/7; 410/8; 410/19; 296/65.04
(58) Field of Search ............................... 410/7–9, 19, 30; 296/65.04; 297/DIG. 4; 280/304.1; 254/2 C; 248/503, 503.1

(56) References Cited

U.S. PATENT DOCUMENTS

| | | | |
|---|---|---|---|
| 1,780,277 | 11/1930 | Seeley et al. | 410/8 |
| 4,973,022 | 11/1990 | Mayland | 248/503.1 |
| 5,037,255 | 8/1991 | Bullock et al. | 410/30 |
| 5,173,018 | 12/1992 | Kissel et al. | 410/30 |
| 5,186,585 | 2/1993 | Sousa et al. | 410/9 |
| 5,388,937 | 2/1995 | Farsai | 410/9 |
| 5,713,704 | 2/1998 | Pommier et al. | 410/9 |
| 5,795,115 | 8/1998 | Collins | 410/22 |
| 6,000,255 | 12/1999 | Lester | 410/7 X |

FOREIGN PATENT DOCUMENTS 918330  2/1963  (GB) ..................................... 410/30

*Primary Examiner*—Stephen T. Gordon
(74) *Attorney, Agent, or Firm*—Young & Basile

(57) ABSTRACT

A clamping apparatus for three or four-wheeled personal vehicles commonly called "scooters" and wheelchairs comprising a baseplate, left and right wheel clamp assemblies slidably mounted on the baseplate, and a cable drive connected between the wheel contact assemblies to pull them together on demand to clamp the outside surfaces of the rear wheels of the scooter. An emergency release is provided.

19 Claims, 4 Drawing Sheets

VEHICLE RESTRAINT APPARATUS

FIELD OF THE INVENTION

This invention relates to a mechanism for anchoring a wheeled vehicle such as a small electrically driven three-wheeled "scooter," and more particularly to an apparatus which can be used to anchor a vehicle by maneuvering the vehicle into a desired position on and over a baseplate and, thereafter, actuating a power system to draw left and right clamping assemblies into engagement with the outside surfaces of one or more wheels of the vehicle.

BACKGROUND OF THE INVENTION

Many persons with limited ambulatory capabilities dramatically increase their range of motion and personal convenience through the use of small electrically driven three-wheeled vehicles known as "scooters." The typical scooter comprises a frame carrying a passenger seat, a steering bar attached to a dirigible front wheel and a pair of spaced-apart, coaxial rear wheels. The dirigible front wheel is typically the driven wheel and is at least partially shrouded by the drive mechanism.

It is common to load the scooter into a larger transport vehicle such as a van which is equipped with an hydraulic lift. After loading the scooter into the transport vehicle, it is highly desirable to provide an apparatus for anchoring and restraining movement of the scooter in three dimensional space during subsequent operation of the transport vehicle.

SUMMARY OF THE INVENTION

The present invention provides an apparatus by which it is possible to simply and easily anchor and restrain the movement of a wheeled vehicle such as a scooter by maneuvering one or more wheels of the vehicle onto a base and thereafter causing a pair of oppositely disposed wheel clamp assemblies to travel toward one another into clamping relationship with one or more wheels of the vehicle and to hold the vehicle in place for as long as is desirable.

In general this is accomplished by providing an apparatus having, in the preferred form, a simple baseplate providing slideways for a pair of left and right wheel clamp assemblies, each of which comprises a carrier assembly slidably mounted on the baseplate for linear translation thereover. A power means, preferably in the form of a variable length cable loop, is operable to pull the left and right wheel clamp assemblies toward one another against the resilient restraint of springs or the like, until the wheel clamp assemblies are in clamping engagement with the outside surfaces of, for example, the spaced rear wheels of a three-wheeled scooter. By means of a simple toggle circuit the motor can be reversed to open the clamping assemblies and permit the vehicle to be removed.

A feature of the invention is that it does not require the vehicle to be centered or otherwise precisely located between the clamping assemblies. This is achieved by means of the aforementioned cable loop wherein the cable is anchored at both ends to one of the carrier assemblies and passes over a simple pulley on the other of the carrier assemblies such that shortening the length of the cable can produce either simultaneous movement of both carriers or, if one of the carriers is stalled against a wheel surface, independent movement of the other carrier until both carriers are in clamping engagement with a wheel surface.

Another feature of the invention is the provision of a positive locator for the restrained vehicle wheel or wheels. In general this is accomplished by and through the combination of a hat-section baseplate, the parallel outer portions of which provide wheel clamp slideways and the recessed center portion of which provides a well into which the rear wheels, for example, of a scooter vehicle can rest to indicate that the scooter is in the proper location to be clamped. This function can be enhanced through the provision of small adjustable bumpers attached to one side of the baseplate.

Another feature of the invention is the provision of an emergency release which allows a restrained vehicle to be removed from the restrained apparatus in the event of a power or circuit failure in the restraining apparatus. In general, this is accomplished by means of a simple mechanical arrangement which detaches the cable loop from one end and permits the springs which resiliently urge the carrier assemblies to the outboard positions to release the restrained vehicle.

Another feature of the invention is the provision of means for overall adjustability in effective width such that vehicles of various dimensions can be accommodated in a single apparatus. In the preferred form, this is accomplished by providing both fixed and variable position stop plates on the baseplate, the stop plates serving not only to provide positive stops for the outward movement of the carrier assemblies, but also to provide locations for spring anchors which mechanically pull the carrier assemblies toward the open position.

These and other features and advantages of the invention are provided in a simple, easily installed and easily operated apparatus which can, for example, be secured to the floor of a van or any other suitable foundation, the details of which are hereinafter described and shown in the accompanying drawings.

DETAILED DESCRIPTION OF THE ILLUSTRATIVE EMBODIMENT

Figure 1:
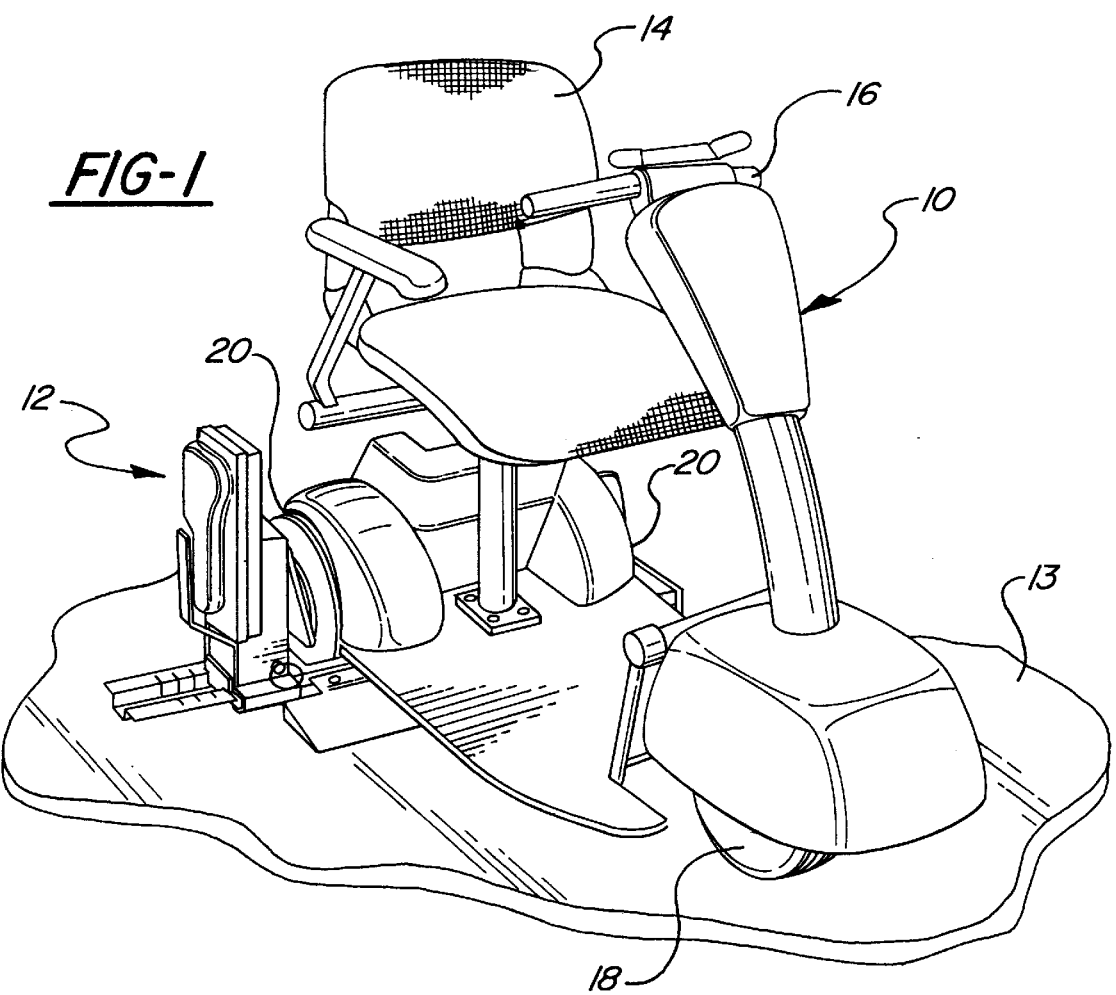
FIG. 1 is a perspective view of a three-wheeled electrically-driven vehicle in association with a restraint apparatus incorporating the present invention.

FIG. 1 illustrates a three-wheeled, personal vehicle 10 secured by a vehicle restraint apparatus 12 which in turn is anchored to the floor pan 13 of a motor vehicle, the details of which are omitted from FIG. 1. The personal vehicle 10 comprises a single occupant seat 14, a steering/control bar 16 connected to a dirigible and electrically-driven front wheel 18 and a pair of spaced apart rear wheels 20. As hereinafter described, the apparatus 12 selectively restrains movement of the vehicle 10 by clamping engagement with the exposed, outside surfaces of the rear wheels 20. The apparatus 12 could, of course, restrain a vehicle by engagement with the opposite outside surfaces of a single wheel; however, as is common, the dirigible wheel 18 of the personal vehicle 10 is shrouded with drive and/or braking mechanisms. This makes the rear wheels the most practical choice for application of the apparatus 12 as hereinafter explained.

Looking now to FIGS. 2–6, the apparatus 12 is shown to comprise a hat-section, steel baseplate 22 having a planar central section 24 provided with holes (not shown) such that it may be bolted to the floor pan 13 of the vehicle only partially shown in FIG. 1. The baseplate 22 further exhibits spaced apart parallel slide portions 26 which are elevated above the central planar portion 24 by approximately one inch. In a practical example the overall length of the baseplate 22 is 36 inches and the overall width about five inches.

Figure 5:
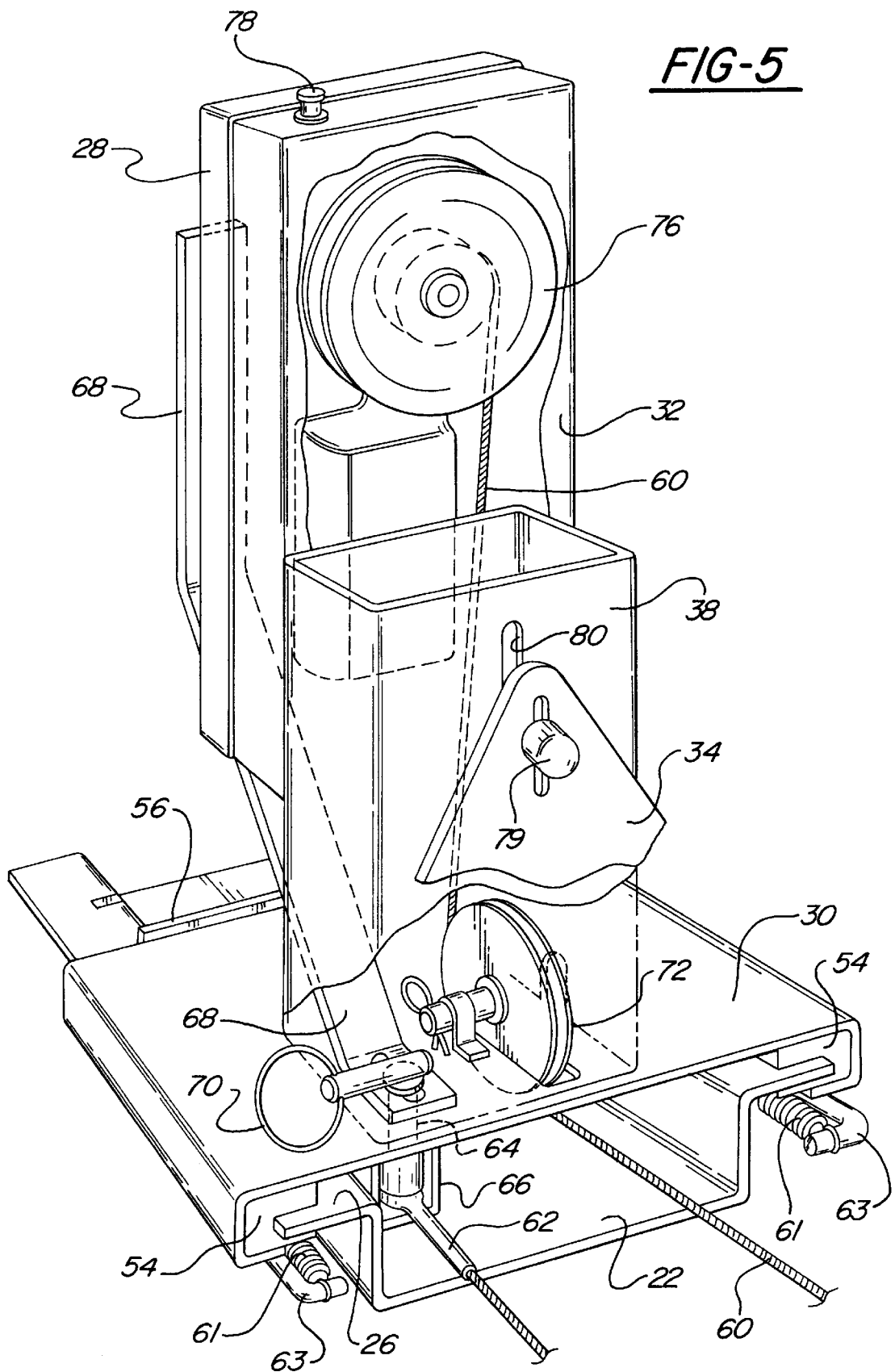
FIG. 5 is a perspective view of the carrier assembly on which the motor is mounted.

The apparatus 12 further comprises a first wheel clamp assembly 28 which includes a slide assembly 30 which straddles the baseplate 22 and wraps around the slideways 26 as best shown in FIG. 5. The steel carrier assembly 30 is equipped with nylon bearings 54 which engage both top and bottom surfaces of the baseplate slideways 26 to permit the clamp assembly 28 to move linearly along the baseplate as required for operation as hereinafter described.

Wheel clamp assembly 28 further includes a motor housing 32 having a top mounted operator push button 78 for purposes to be described.

Wheel clamp assembly 28 further comprises a triangular steel wheel contact adapter plate 34 which is adjustably mounted on the assembly 28 and which is provided with a triangular arrangement of adjustable wheel contacts 79 mounted in slots 80.

On the opposite end of the baseplate 22 is a second or left hand contact assembly 39 comprising a steel slide assembly 40 which straddles and wraps around the baseplate slideways 26 and is further provided with nylon bearings 52 to reduce friction and promote free movement of the carrier assembly 40 longitudinally along the axis of the baseplate 22. The assembly 39 further comprises an adjustable triangular steel wheel contact adapter plate 42 having cylindrical wheel contacts 79 mounted in slots 80 essentially in mirror image fashion to the arrangement on the opposite assembly 28.

Figure 4:
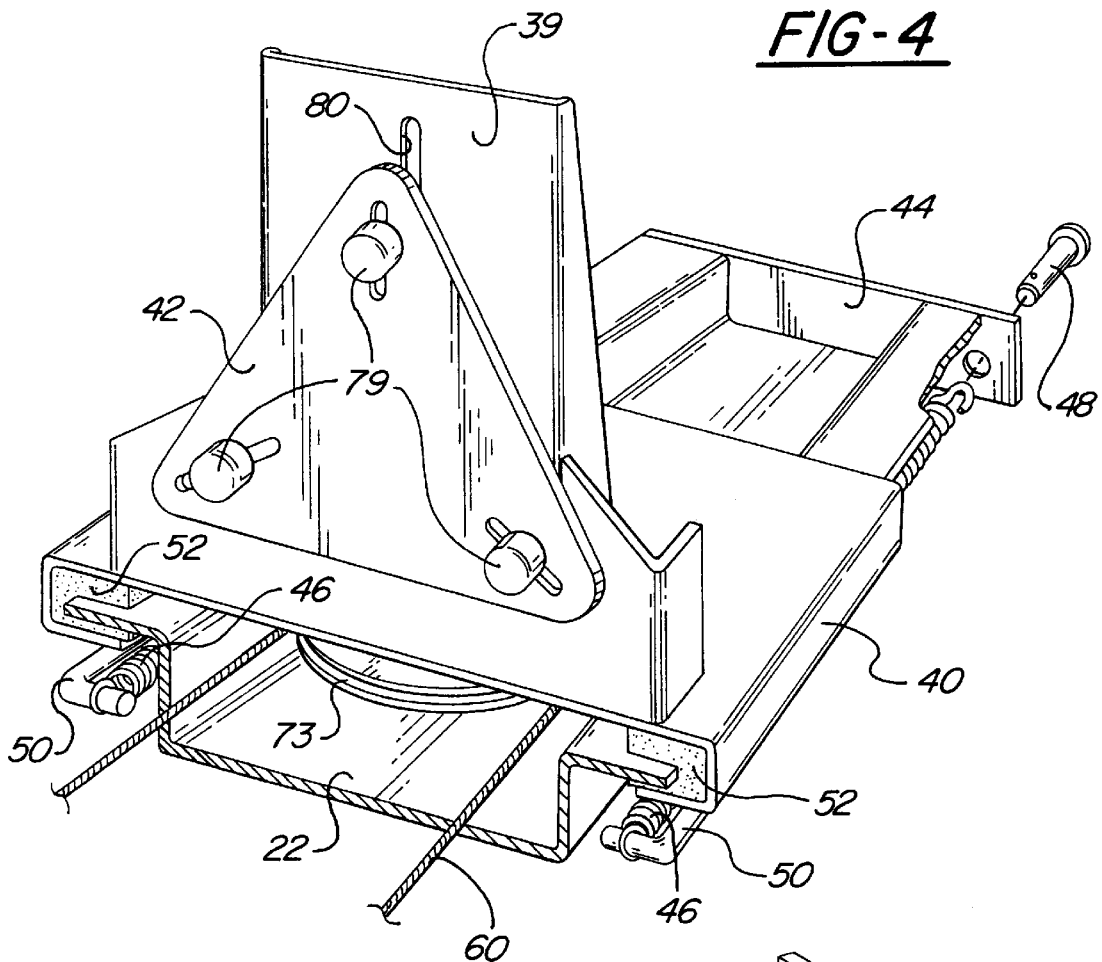
FIG. 4 is a perspective view of the passive carrier assembly.
Figure 6:
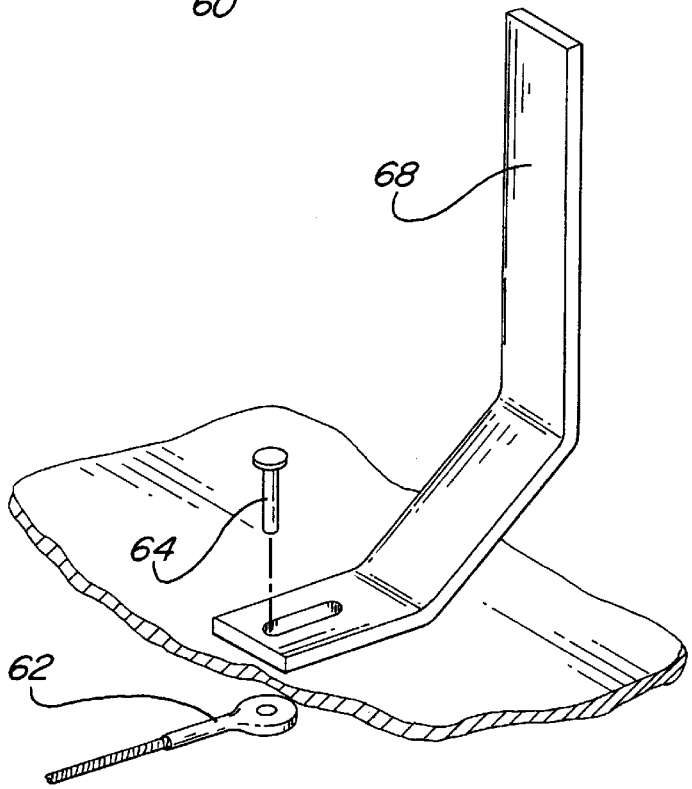
FIG. 6 is a detail of the mechanical cable release.

The slide assembly 39 is urged in the outboard direction against a welded-on mechanical stop plate 44 by means of springs 46 which are connected between pins 48 on the outboard end and L-shaped steel rods 50 which are welded to the bottom of the slide assembly 40 as best shown in FIG. 4. The springs 46 are tensioned as the slide assembly 40 is moved by motive power away from the stop plate 44 as hereinafter explained.

Figure 2:
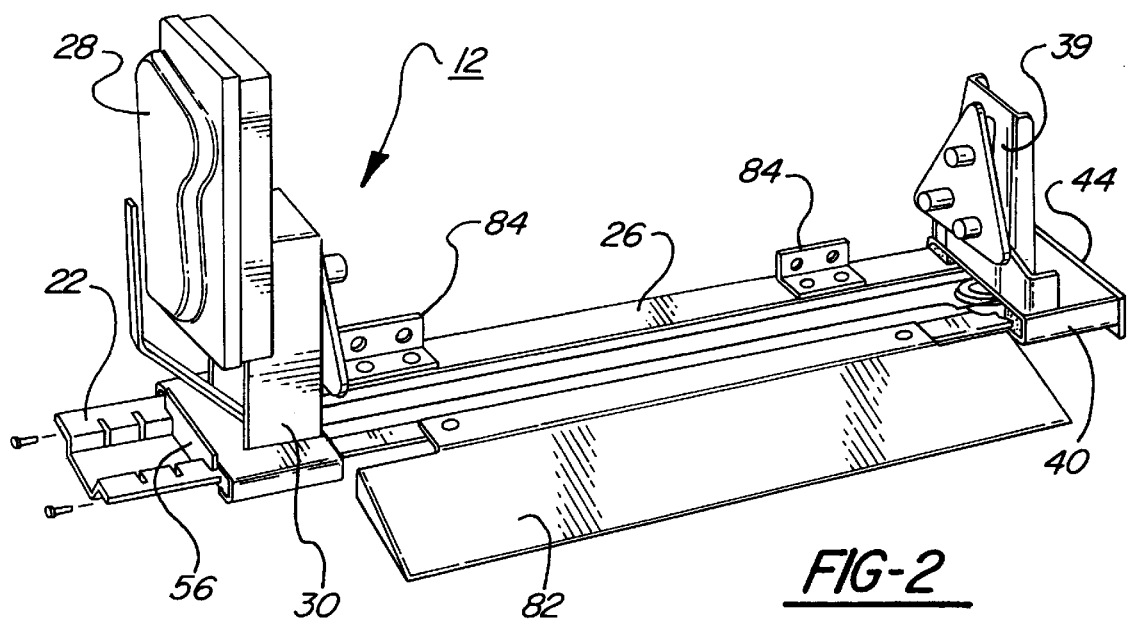
FIG. 2 is a perspective view of the restraint apparatus of FIG. 1.
Figure 3:
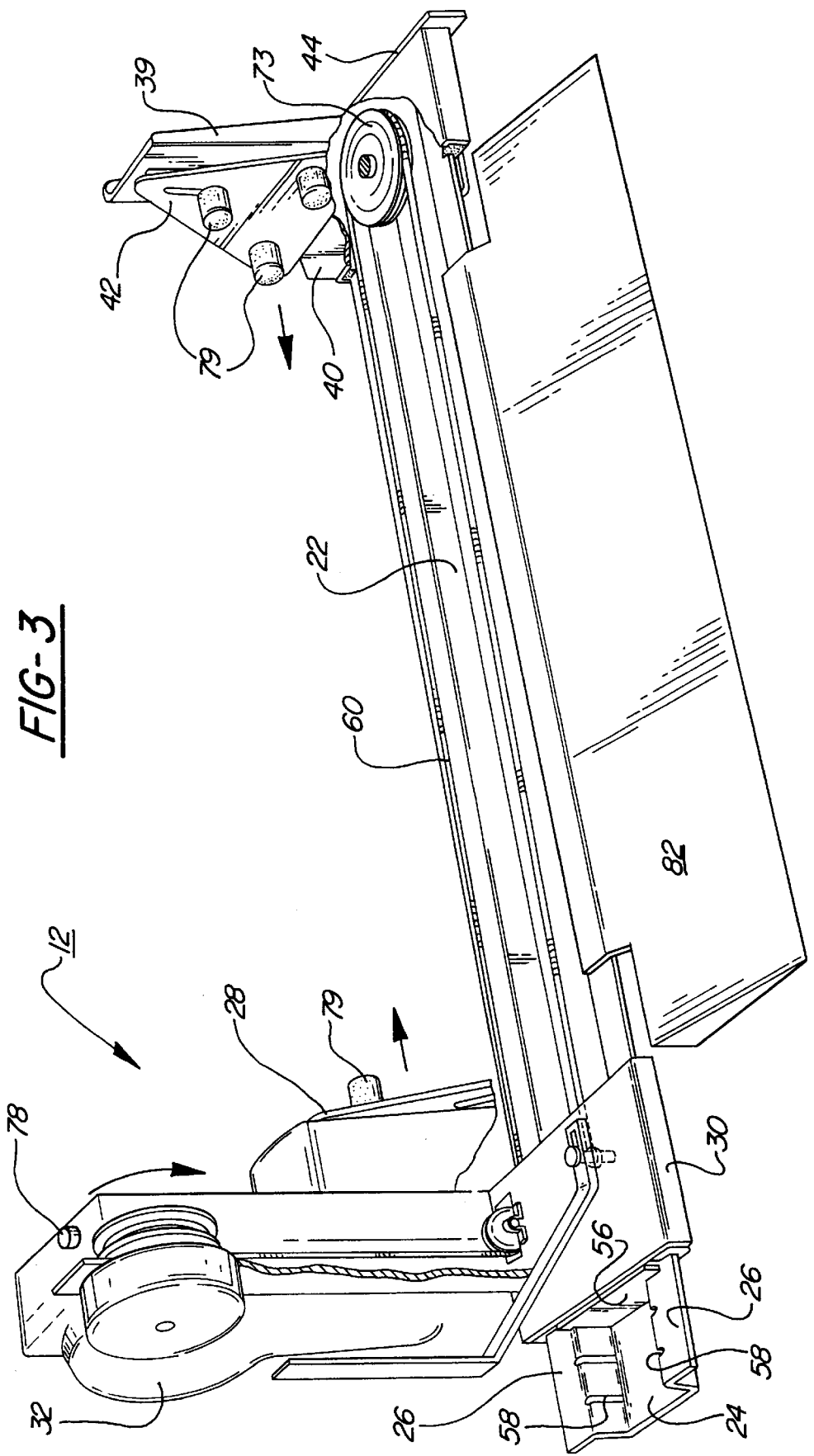
FIG. 3 is a detailed view of the apparatus of FIG. 2 with parts broken away to reveal internal details.

Returning to the left side assembly (as shown in FIGS. 2 and 3), a variable position mechanical stop plate 56 is mounted in one of several sets of slots 58 on the baseplate 22 to provide a variable position mechanical stop for the slide assembly 28. As shown in FIG. 5, L-shaped rods 63 are welded to the bottom of the slide assembly 30 to provide anchor points for tension springs 61 mounted between the movable baseplate 56 and the inboard portions of the L-shaped rods 63. Pins (not shown) extend through holes (not shown) in the bottom left and right corners of the movable stop plate 56 to receive the fixed ends of the restraining springs 61 for the slide assembly 30 so that it is also urged to the outboard limit; away from the opposite assembly 40 on the other side of the baseplate 22.

To selectively move the slide assemblies 30 and 40 toward one another to clamp the vehicle 10 when in position, a motor 76 carried by the assembly 38 receives one end of a wire cable 60 which passes downwardly through the assembly 38 to an idler pulley 72 mounted on a pin which is strapped to the frame of the carrier assembly 30. The cable 60 then passes along one side of the open trough of the center section 24 of the baseplate 22 to the opposite slide assembly 40 where it passes around a second idler pulley 73 which is suitably secured to the steel frame of the slide assembly 40 such as by a bolt and bearing assembly as will be apparent to those skilled in the art. Cable 60, after turning around the idler pulley 73, returns to the slide assembly 30 where it is mechanically secured to a crimped eyelet 62 which in turn is fixed to the slide assembly 30 by means of a pin 64 which is protected by a weldment 66 on the bottom of the assembly 30. The pin 64 is engaged by an emergency release arm 68 which can be operated by the user of the apparatus 12 in emergency situations after pulling the release inhibitor pin 70 shown in FIGS. 5 and 6.

Because the cable 60 is fixed at both ends to the slide assembly 30 and loops around the pulley 73 on the opposite slide assembly 40 but is not connected to the baseplate 22, shortening the effective length of the cable 60 by operating motor 76 through push button 78 pulls the slide assemblies 30 and 40 toward one another whether or not one of the slide assemblies is stalled against the face of a wheel; i.e., if one of the two slide assemblies is in engagement with a wheel and therefore stalled against further movement, further shortening of the cables is accommodated by movement of the opposite slide assembly until it to is in engagement with the face of the associated vehicle wheel. By reason of this "free floating" arrangement, it is unnecessary for the operator of the vehicle 10 to ensure that it is precisely centered between the left and right slide assemblies 30 and 40 of the apparatus 12.

In the event of an emergency such as might be caused by failure of the motor 76 or associated push button circuitry, the operator can release the vehicle 10 from the clamping/restraining apparatus by pulling the pin 70 and pushing on the lever 68. This releases the eyelet end 62 of the cable 60 from the slide assembly 30 and the return springs cause physical separation of the slide assemblies thereby releasing the vehicle 10 from the clamping engagement therewith.

OPERATION AND DETAILS

In operation the user of the vehicle 10 simply backs it toward the apparatus 12 until the rear wheels of the vehicle 10 ride up the optional assist ramp 82 and settle within the center trough 24 of the baseplate 22. Falling into the center trough gives the operator of the vehicle 10 a positive indication that the scooter vehicle 10 is in the proper position. Angle iron type curb devices 84 may be bolted to one of the slideways 26 in appropriate spaced relationship to meet the wheels of the vehicle 10 to ensure that the vehicle does not pass completely over the baseplate 22. Once the vehicle 10 is properly positioned, the operator simply reaches down with his/her right hand and presses the push button 78 to actuate motor 76. The circuitry used for this purpose is similar to that used for the alternatingly opposite operation of a garage door lifting/closing mechanism as will be apparent to those familiar with elementary electronics; one depression of the push button toggles the circuit to supply current to the motor 76 in one direction through one or more controlled devices such as transistors whereas the next operation of the push button switches the bistable circuit to reverse motor current direction by shutting off the first set of transistors in the circuit and activating a second set.

Rotation of the motor 76 pulls on the cable 60 and effectively shortens its length until the adapter plates 34 and 42 and the contacts 79 mounted thereon are brought into engagement with the opposite exposed surfaces of the wheels 20 on the vehicle 10. The contacts typically engage the wheels of the vehicle 10 in surrounding relationship to the wheel bearing hub to provide a strong mechanical three-dimensional clamping force which holds the vehicle securely in place. It will be apparent to those skilled in the art that the plates 34 and 42 and the contacts 79 may take various forms according to the mechanical configuration of the wheel or wheels on the vehicle clamp. The arrangement shown in the drawing has been found to be particularly suitable for typical dish-shaped wheels made of stamped steel. However, an alternative design comprising a cup-shaped contact has also been found suitable for use with many wheels. In this case, the cup-shaped contact telescopes over the wheel bearing/axle cover and also serves to provide a strong longitudinal clamping force as well as fore and aft restraints as is desired for the proper operation of the present invention.

In the event of a failure of the circuitry or motor as described above, the operator may pull pin 70 and push the release rod 68 to disengage the cable 60 from the slide assembly 30 whereupon the springs open the assembly and permit release/removal of the vehicle 10.

The majority of the parts of the apparatus 12 described above are made from commonly available medium carbon steel of approximately 3/16 inch thickness. The fasteners are commonly available machine screws, bolts, nuts and washers and the electrical components are commonly available as described above. While the invention has been disclosed for use in combination with a three-wheeled and four-wheeled personal vehicle of the type used by handicapped persons in many environments, the invention is also suitable for use with a variety of other vehicles such as golf carts, motorcycles, bicycles and even conventional automobiles. It is of course necessary for at least a portion of a wheel or other structure of the vehicle to be exposed in a more or less symmetrical fashion so that opposed clamping forces can be applied.

What is claimed is:

1. In combination, a wheeled vehicle of the type having a longitudinal axis and at least one wheel with exposed side surfaces;
    a restraint apparatus for said vehicle comprising:
        a base member disposed laterally across said axis;
        a left side clamp assembly configured to clampingly engage a wheel side surface and mounted for linear translation on the base member;
        a right side clamp assembly configured to clampingly engage another wheel side surface and mounted for linear translation laterally of said axis on the base member; and
        power means for causing the left and right side wheel clamp assemblies to translate toward one another to clamp the wheel side surfaces therebetween and restrain movement of said wheeled vehicle.

2. Apparatus as defined in claim 1 wherein the base member comprises a plate attachable to a foundation, each of said left and right side wheel clamp assemblies including a carrier member slidably mounted on said plate.

3. Apparatus as defined in claim 2 wherein said plate has an inverted hat-shaped section with spaced parallel raised edge portions and a depressed center portion between said edge portions, said carrier members being supported on said parallel raised edge portions for linear translation along said plate.

4. Apparatus as defined in claim 3 wherein said depressed center portion serves as a wheel well to locate at least one wheel of a wheeled vehicle thereon.

5. Apparatus as defined in claim 2 wherein said power means comprises a cable linking the left and right side carrier members in a loop fashion and a motor for controlling the length of said cable between the left and right side carrier members, thereby to draw the carrier members toward one another when the length of said cable is reduced.

6. A restraint apparatus for a wheeled vehicle of the type having at least one wheel with exposed side surfaces comprising:
    a base member;
    a left side clamp assembly adapted to engage a first wheel side surface and mounted for linear translation on the base member;
    a right side clamp assembly adapted to engage a second opposite wheel side surface and mounted for linear translation on the base member;
    power means for causing the left and right clamp assemblies to translate toward one another to clamp said wheel side surfaces therebetween and restrain movement of said wheeled vehicle;
    said base member comprising a plate attachable to a foundation;
    each of said left and right side clamp assemblies including a carrier member slidably mounted on said plate;
    said power means comprising a cable linking the left and right side carrier members in a loop fashion and a motor for tightening said cable between the left and right side carrier members thereby to draw the carrier members toward one another; and
    means for resiliently urging the carrier members away from one another.

7. Apparatus as defined in claim 6 wherein said means for urging comprises springs having one end mounted to the base member and another end mounted to a carrier member.

8. Apparatus as defined in claim 2 further including mechanical stops mounted to said plate at locations representing the left and right outboard limits of motion of said carrier members.

9. Apparatus as defined in claim 8 wherein at least one of said stops is adjustable in position.

10. Apparatus as defined in claim 7 further including curb means mounted on said plate for providing a positive locator to a wheel of a wheeled vehicle resting on said plate.

11. Apparatus as defined in claim 6 further including bearing means for mounting said carrier members on said plate.

12. Apparatus as defined in claim 6 further including ramp means for adjacent association with said plate.

13. Apparatus as defined in claim 2 further including adapter means mounted on said carrier members for engagement with the outside surfaces of at least one wheel of a wheeled vehicle.

14. Apparatus as defined in claim 13 wherein said adapter means comprises a plurality of mechanical contacts adjustably mounted on a plate which in turn is mounted on each said carrier member.

15. Apparatus as defined in claim 5 further including emergency release means for releasing said cable from restraining relationship with said carrier members.

16. In combination:
    a small vehicle of the type having a pair of similar, coaxial but linearly spaced ground engaging wheels having exposed outside surfaces;
    restraint apparatus for said vehicle comprising:
        a rigid baseplate adapted to be secured to a foundation and defining slideways;

a first wheel clamping assembly including bearing means mounted on at least one of said slideways for linear translation over and along said baseplate;

a second wheel clamping assembly having bearing means slidably mounted on at least another of said slideways for linear translation over and along said baseplate;

bias means for urging said first and second wheel clamping assemblies away from one another to permit the spaced apart wheels of said vehicle to be located therebetween; and power means for urging said wheel clamping assemblies toward one another to engage opposite exposed outside surfaces of respective wheels of said vehicle and restrain said vehicle in relationship to said baseplate and between said clamping assemblies.

17. Apparatus as defined in claim 16 wherein said power means comprises a motor mounted on one of said clamping assemblies, a cable extending from said motor to and around a pulley mounted on the other of said clamping assemblies and back to said one clamping assembly;

means for actuating said motor to shorten the effective length of said cable to draw said assemblies toward one another.

18. Apparatus as defined in claim 17 further including emergency release means for disconnecting at least one end of said cable from said one clamping assembly.

19. A device for securing a vehicle comprising:

a linear base plate fixedly mounted on a stable support surface and adapted to support the weight of opposed wheels of a vehicle when the wheels of a vehicle are disposed thereon;

first and second slidable end members displaceably mounted on the base plate for displacement toward and away from one another;

first and second wheel engaging adapter members mounted on said slidable first and second end members respectively for clamping engagement with the side surfaces of said opposed vehicle wheels when said wheels are disposed on said base plate; and mechanical means for locking said end members with said wheel engaging members in clamping engagement with said opposed wheel side surfaces to restrain movement of said vehicle in all directions relative to said base plate.

* * * * *